Figure 6:
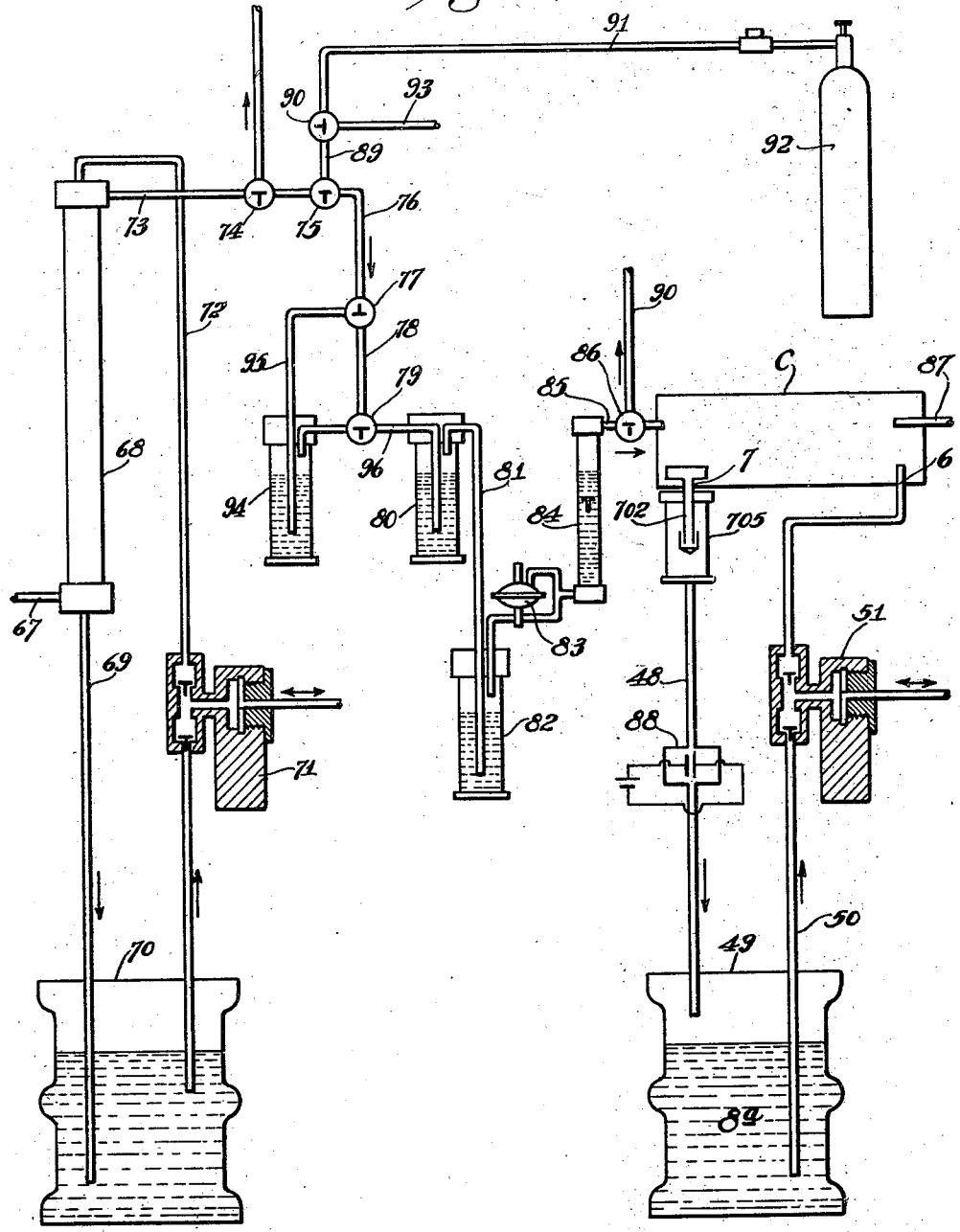

May 28, 1946. W. P. YANT ET AL 2,401,287
CONTINUOUS ELECTROLYTIC GAS TESTING
Filed Feb. 18, 1941 3 Sheets-Sheet 1
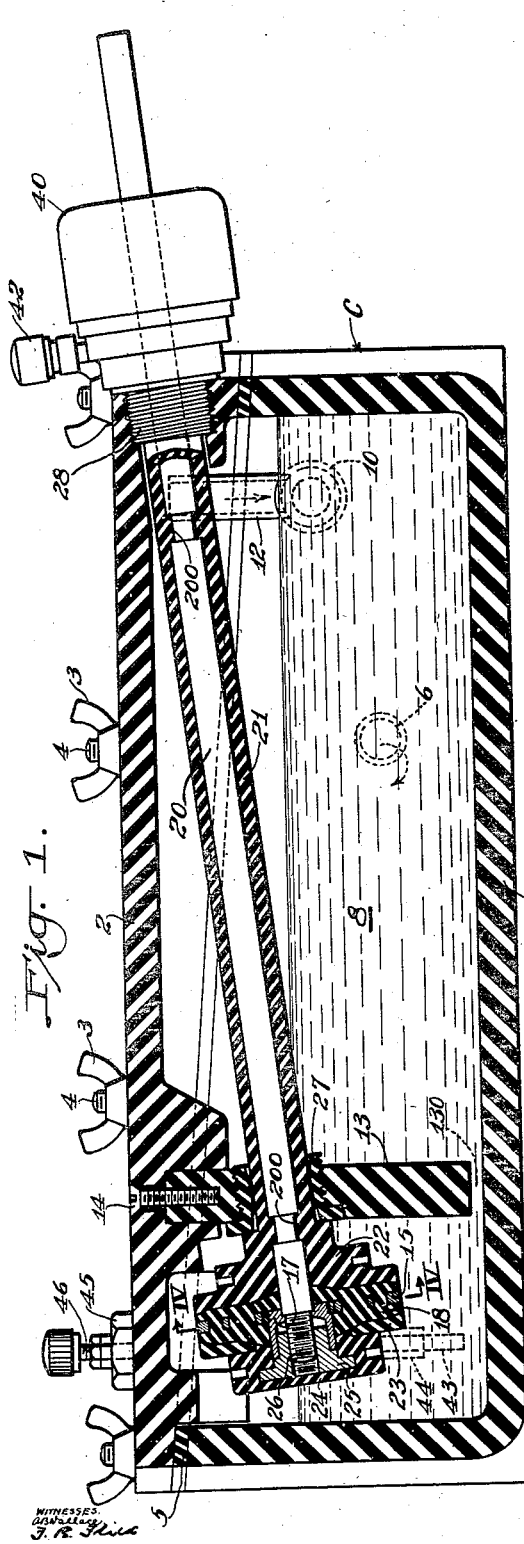
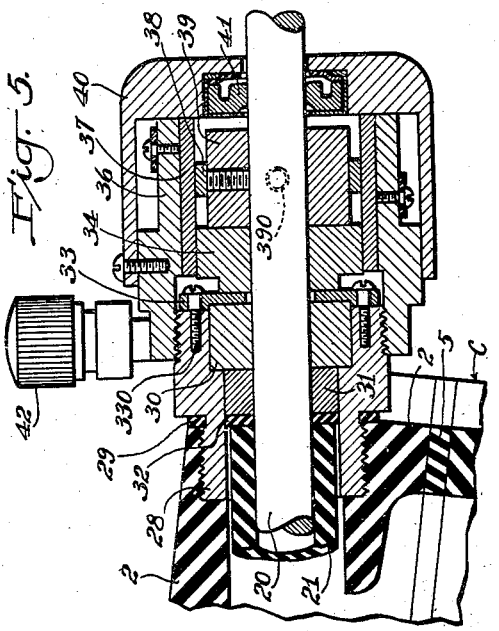
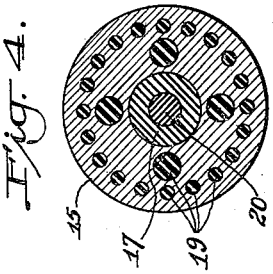
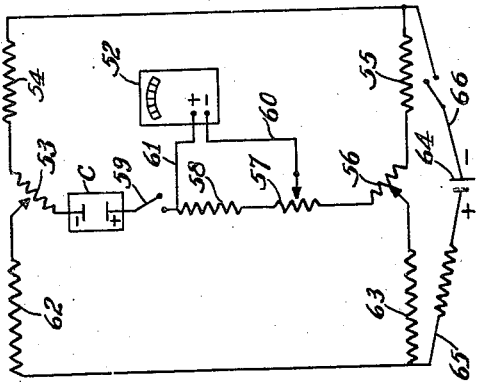
INVENTORS
William P. Yant
Moses G. Jacobson
John P. Strange
BY
ATTORNEYS.

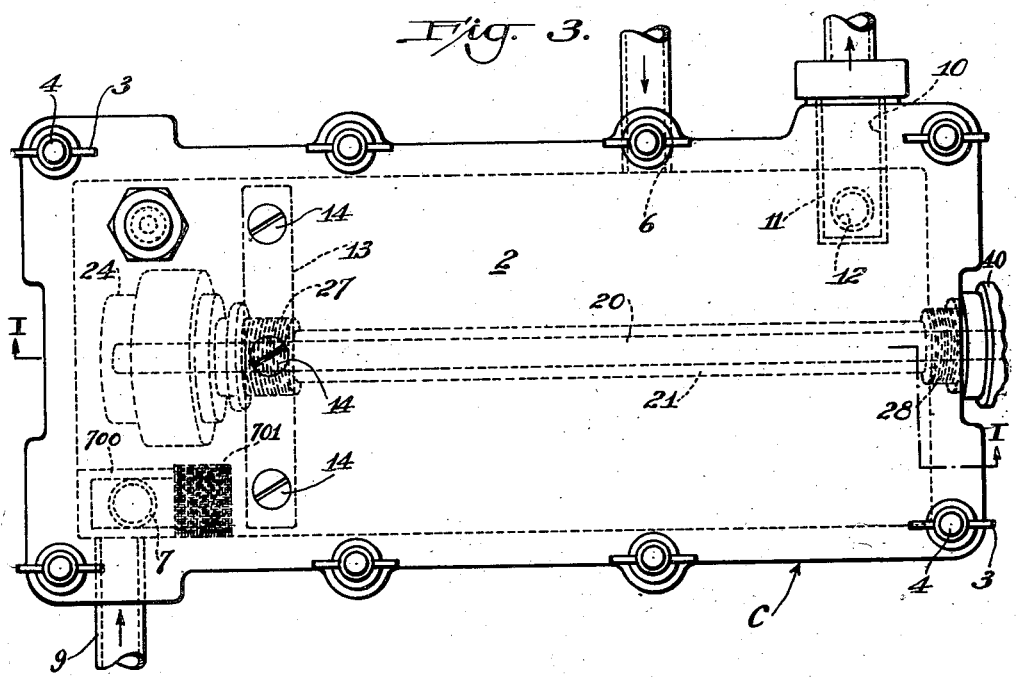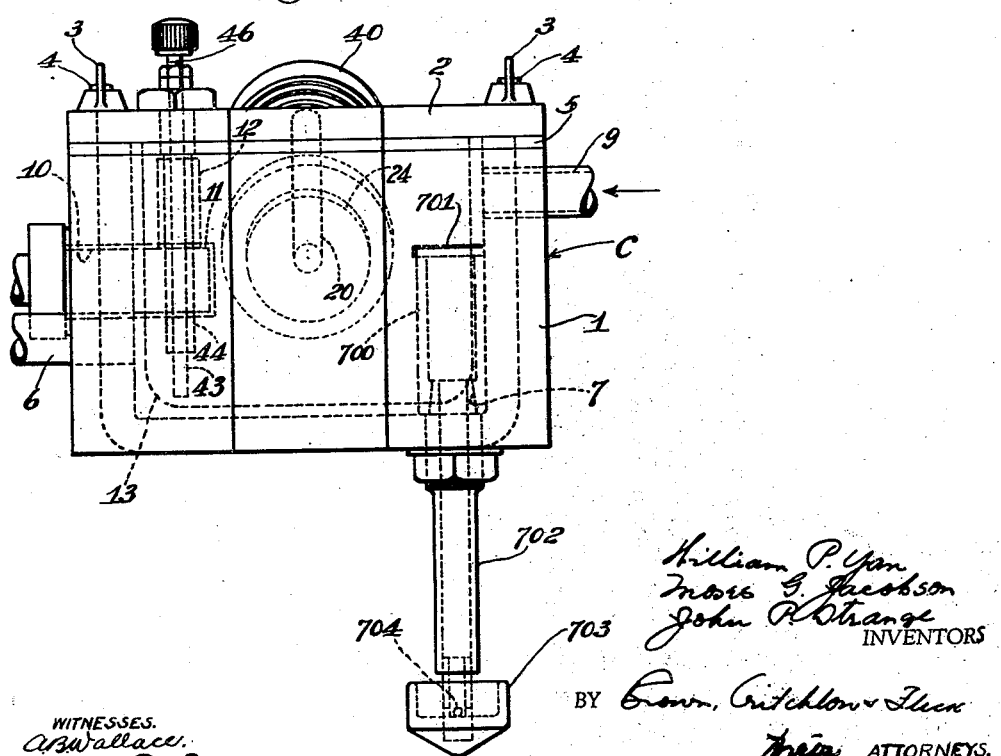

Patented May 28, 1946

2,401,287

UNITED STATES PATENT OFFICE 2,401,287

CONTINUOUS ELECTROLYTIC GAS TESTING

William P. Yant, Murraysville, Moses G. Jacobson, Verona, and John P. Strange, Wilkinsburg, Pa., assignors to Mine Safety Appliances Company, Pittsburgh, Pa., a corporation of Pennsylvania Application February 18, 1941, Serial No. 379,448

2 Claims. (Cl. 204—1)

This invention relates to gas testing, and more particularly to methods of and apparatus for continuously determining the presence or quantitatively determining the concentration of particular constituents of gases or gas mixtures.

Patent No. 2,156,693, granted May 2, 1939, to one of the present applicants discloses a particularly satisfactory method and apparatus for detecting or quantitatively determining particular constituents of gaseous mixtures. In accordance therewith the gas to be tested is passed into a cell containing a pair of electrodes one of which is inert with respect to the gaseous constituent to be determined and the other of which is reactive therewith, and containing also an electrolyte capable of destroying or removing from the active electrode the product of reaction formed by the constituent to be determined. When the constituent to be determined is present in the gas passed into the cell it will react with the active electrode, and an electromotive force will then be created between the reacted portion of the active electrode and the inactive electrode which may be applied to indicate the presence or concentration of the constituent. For mere qualitative work the creation of such an electromotive force is an indication of the presence of the constituent. Quantitative determination of such constituents is predicated upon the fact that the E. M. F. generated is a function of the concentration of the constituent in the gas mixture. Therefore, when equilibrium is established between the reaction of the gaseous constituent and the active electrode on the one hand, and the displacement of the reaction product from the active electrode on the other hand, the E. M. F. generated may be used as a direct measure of the concentration of the constituent.

As disclosed in the aforesaid patent, it is preferred to use electrodes of the same material because in this manner no substantial E. M. F. will be generated in the absence of the constituent to be determined. One electrode is then maintained inactive by keeping it submerged in the electrolyte, and the establishment of equilibrium conditions or the reconditioning of the active electrode for a further test may be accomplished by periodically submerging the reactive electrode in the electrolyte, as by using a rotary electrode mounted so that part is exposed to the electrolyte and part to the gas, so that reacted portions are continuously moved into the electrolyte, and cleaned portions are continuously returned for exposure to gas. Establishment of equilibrium conditions is thus accomplished by rotation of the electrode.

The invention of that patent constituted a real advance in the art of gas testing, and instruments built in accordance with it are operating satisfactorily. However, the apparatus disclosed in the patent is adapted primarily to intermittent operation rather than to continuous use, for example for continuous automatic recording or controlling of gas concentrations for various purposes such, for example, as in gasoline refining, hydrogenation, heat treating of steel, inert gas generation, and various other industrial purposes. Thus, the apparatus shown in the patent involves the use of electrodes having very large exposed surface areas relative to the volume of the electrolyte so that the composition of the electrolyte may change rapidly with consequent change in the sensitivity, particularly at high concentrations of reactive constituents. Consequently if such apparatus be used for continuous recording or controlling purposes either the results may become inaccurate or frequent attention will be required to maintain the sensitivity. Moreover, in continuous operation it is desirable to circulate the electrolyte through the cell while maintaining a constant electrolyte level, and not only is no provision made therefor in the apparatus described in the patent, but also, as we have found, difficulties may be encountered in achieving that end. Again, it is highly desirable that means be provided to maintain the sensitivity in operation and the zero reading in the absence of the constituent to be determined, which must be simple and should be capable of operating independently of each other.

It is among the objects of this invention to provide a continuous method of gas testing whereby the presence or concentration, either or both, of a particular constituent of the gas being tested may be rapidly and readily determined, which is simple, is satisfactorily accurate, does not require complicated and expensive apparatus, which depends upon the generation of an electromotive force that is a definite function of the concentration of that constituent, which permits continuous operation over relatively long periods of time with maintained satisfactory operating accuracy and with minimum servicing or attention, which avoids the disadvantages met in applying prior art methods to continuous operation, and which particularly permits the application of the method of the above-identified patent to continuous operation.

A special object of the invention is to adapt the method of the above-identified patent to continuous operation and with avoidance of the difficulties encountered in applying that prior method to continuous use.

Another special object is to adapt the apparatus disclosed in the above-identified patent to continuous operation.

A further object is to provide an apparatus for performing the method provided by the invention, which is simple, sturdy, permits circulation of electrolyte with maintenance of constant level in the cell and, if desired, regeneration of electrolyte, in which the chemical action between the electrode and the electrolyte is held to a minimum consistent with satisfactory operation.

Yet another object is to provide an electrode for gas testing apparatus whose operation depends upon chemical reaction between the electrode and the gas, which provides restricted reactive area, is sturdy, leakproof, simple, and easily constructed, and in which the active element is easily replaceable when needed.

Still another object is to provide means for maintaining at constant level liquid circulated through a container, which is inexpensive, simple, easily made and installed, and effectively serves its purpose irrespective of capillary forces and changes of pressure of gas within the container or of the atmospheric pressure.

Other objects will appear from the following description.

The invention will be described with reference to the accompanying drawings in which Fig. 1 is a vertical longitudinal section through the cell along the line I—I, Fig. 3; Fig. 2 an end elevational view of the cell; Fig. 3 a plan view of the cell shown in Figs. 1 and 2; Fig. 4 a sectional view through the active electrode taken on line IV—IV, Fig. 1; Fig. 5 a longitudinal sectional view on an enlarged scale of the right-hand portion of the shaft assembly shown in Fig. 1; Fig. 6 a schematic representation of one mode of practicing the invention as applied to the determination of oxygen in admixture with other gases; and Fig. 7 is a schematic wiring diagram illustrating a circuit in accordance with the invention for independently adjusting or correcting changes in sensitivity and zero reading.

In accordance with the invention the difficulties due to rapid changes in electrolyte composition are reduced by restricting the reactive area of the active electrode, and by circulating the electrolyte, which may be regenerated, if desired, before returning it to the cell. Also, sensitivity changes occurring over a period of time in continuous operation and changes in the zero reading are corrected independently of each other. The attainment of the objects of the invention and these and other advances will appear from the following description of the preferred embodiment.

Having reference to Figs. 1 to 5, the apparatus shown comprises a cell C having a container 1 forming a chamber for receiving the electrolyte and electrodes, and a cover 2. These are constructed from any suitable material which is a non-conductor of electricity such, for instance, as glass, synthetic resin, hard rubber, or other material of suitable dielectric properties. Cover 2 may be fastened to container 1 by wing nuts 3 which cooperate with stud bolts 4 mounted in the upper wall of the cell, a gasket 5 being interposed between the cover and the container to provide a gas-tight joint. The container is provided also with openings 6 and 7 which act, respectively, as an inlet and outlet for recirculation of electrolyte 8. It is provided also with an opening at one end associated with a conduit 9 for introducing gas to be tested. Means are provided also for withdrawing the gas, and in the embodiment shown in Figs. 1 and 2, this is accomplished by a gas outlet port 10 disposed below the electrolyte level in the wall opposite and at the end remote from inlet 9. Extending inwardly into the container from outlet 10 is a conduit 11 from which conduit 12 extends upwardly and is open to the atmosphere above the electrolyte within the cell.

A partition member 13 is suspended from cover 2 by means such as screws 14. This partition extends downwardly into the container and divides the cell into two compartments, and it is constructed or arranged to permit gas to flow from one compartment into the other and to permit electrolyte to flow through the cell from the inlet 6 to the outlet 7. If partition 13 extends to the bottom of container 1 this may be accomplished by openings through the lower end of the partition. Suitably, however, partition 13 extends close to but short of the bottom and walls of container 1, as seen in Fig. 1, leaving a space 130 through which both electrolyte and gas may pass in their travel through the cell.

In one of the chambers formed by partition 13 there are mounted an active and an inactive electrode. The active electrode, in accordance with the invention, embodies a portion of metal or alloy, or other material, which is reactive with the constituent to be determined. A particular feature of this invention resides in highly restricting the area of active material as compared with prior art apparatus of this general type. This is accomplished, in accordance with the invention, by providing a plate member, which is suitably of disc form, of the desired metal or other material and providing its faces with a coating that is inert both to the constituent to be determined and also to the electrolyte, so that only the edge of the plate is subject to chemical change. In this manner the amount of reaction product formed between the active electrode and the gas is very substantially less than in the practice of the invention disclosed in the aforesaid patent. Thus equilibrium between the reacted electrode and the electrolyte is accelerated and changes in composition of the electrolyte are greatly retarded as compared with such prior practice. The plate or disc used in making the electrode may be quite thin, the exact thickness depending, of course, upon the particular constituent to be determined, the degree of its reactivity with the active electrode, the sensitivity necessary, the character of the electrolyte, and such factors, but it is to be understood that in any given instance the exposed, or reactive, area of the electrode is small.

The major faces of the electrode plate may be rendered inert in various ways, as by electroplating with one of the noble metals, e. g., gold or platinum, or by applying enamels, plastics, or other inert and non-conducting materials thereto. For many purposes molded facings of rubber or the like are more suitable for this purpose, but it is difficult to prevent seepage of electrolyte between such facings and the electrode, which would tend to defeat the purpose of restricting the active exposed area of this electrode.

An important feature of the invention resides in a particular mode of constructing such faced electrodes. We have discovered that electrodes suited to the purposes of the invention may be provided by associating facings of rubber or like material having resilient properties to the major faces of the electrode plate and compressing the facings against the plate between backing members carried on a shaft and having surfaces complementary to the contiguous surfaces of the facing members. In this manner only the edge of the plate is exposed to reaction, and seepage between the plate and the facings is eliminated.

Such electrodes may be used in various ways as disclosed in the above-mentioned patent, as by so constructing the cell that the electrode is intermittently exposed to the gas to be tested, but preferably this is accomplished by rotating the electrode, and the invention will be further described with reference to such preferred embodiment.

Having reference to Fig. 1, a rotary electrode constructed in accordance with the invention comprises a disc 15 of metal reactive with the constituent to be determined. It is provided with a central aperture which is threaded to receive a bushing member 17 that may be soldered or sweated to the disc. The opposite faces of disc 15 are then provided with a heavy coating of rubber, most suitably by molding the disc in rubber 18, and to this end the disc is provided with a plurality of axial openings 19 for securing the molded rubber in place. Bushing 17 is provided with a central aperture which snugly receives an electrode-supporting shaft 20. To protect the shaft from attack by the electrolyte or gas being tested, the exposed portion above the electrode is provided with an inert coating, or sleeve, 21 of rubber or other suitable material, and the shaft may be provided with cutback portions 200 to hold the sleeve in place. Adjacent the electrode the sleeve 21 is extended to form a backing member 22 whose outer face is shaped complementary to the adjacent molded face of the electrode member. The electrode member is compressed against backing member 22 by another backing member which in the embodiment illustrated comprises a hard rubber ring 23 whose inner face is complementary to the contiguous face of the electrode coating 18 and which is urged thereagainst by a metal cap 25 having its exposed surface moldably embedded in rubber 24. Cap 25 is provided with threads which cooperate with threads 26 formed on the outer end of shaft 20. Cap 25 acts on backing member 23 to compress the rubber facing 18 between it and backing member 22 so that coating 18 is forced against disc 15 to prevent any electrolyte seepage between the coating 18 and the plate 15.

We have found that sealing may be effected particularly satisfactorily by tapering the edge of coating 18 inwardly and the central portion outwardly to provide a thickened central portion, as shown in Fig. 1. Such contouring of the electrode coating causes it to move radially against the shaft 20 and radially toward the edge of the disc so as to effect unusually good sealing.

A particular advantage of the construction described is that the electrode member itself may be replaced readily when, as will occur, the edge has become corroded away as a result of reaction with the gas being tested. It is necessary only to remove cap 25 and backing member 23, when the electrode may be slipped from the shaft and a new coated electrode put in its place and the elements reassembled. Thus destruction of the active element neither necessitates discarding the entire assembly, nor dismounting of the shaft.

To avoid the difficulties which attend the use of a shaft mounted below the electrolyte level, shaft 20 is associated with the cell in such manner that its upper end extends through the cell wall above the level of the electrolyte, as seen in Fig. 1. The shaft is carried by a bearing member 27 mounted in partition 13, and by a bearing and electrical connection assembly 28 mounted in the cover, the shaft and cover being to this end sloped from one end to the other as shown in Fig. 1. An advantage of this construction is, as will be apparent from Fig. 1, that the cover and electrodes are assembled together so that they may be removed and handled as a unit.

The outer bearing assembly and the mode of connecting this electrode to the electrical measuring system will appear clearly from Fig. 5. Shaft 20 extends through a metallic bushing 28 mounted in cover 2 and is sealed against leakage of gas by a gasket 29 which acts also to insulate the assembly electrically. The outer end of bushing 28 receives a bronze bearing 30. A felt sealing washer 31 is mounted in bushing 28 below bearing 30, and to reduce scuffing of the felt by rubbing against the rubber 21 there is interposed therebetween a gasket 32 having a smooth, hard surface, e. g., of "Bakelite" or the like. The bearing and washer are held in place by a cap plate 33 held against bushing 28 by screws 330, and to prevent end play a collar 34 is suitably locked to the shaft. A hollow brush holder 36 is threaded on the outer end of bushing 28, and mounted therein is a cylindrical brush plate 37 which carries brushes 38 for picking up the electromotive force generated within the cell, this E. M. F. being conducted from electrode disc 15 through shaft 20 to a stainless steel contact member 39 mounted on shaft 20 and locked in position by said screws 390. The assembly is covered by a cap member 40 which may carry a felt washer 41 to prevent seepage of oil or other material downwardly along the shaft. Brushes 38 are electrically connected to a binding post 42 for connecting electrode 15 with the electrical circuit.

Returning now to the description of the apparatus shown in Figs. 1 to 4, there is provided also an inactive electrode which in the embodiment shown comprises a rod 43 of metal, suitably the same as disc 15, whose lower portion is submerged in electrolyte 8 but the exposed portion of which is completely encased in insulating inert material 44, such as rubber. This electrode is therefore inert to the gas passed through the cell. The electrode extends through cover 2, being held in place by a lock nut 45, and its outer end forms a binding post 46 for connecting this electrode to the electrical system.

If the active electrode is mounted horizontally in the cell difficulties may be encountered in satisfactorily and cheaply preventing electrolyte leakage. These are overcome simply and cheaply, and leakage avoided, by the manner of mounting the active electrode. Slight gas leakage may occur through the bearing and electrical contact assembly, but this is in most instances of slight importance because under all ordinary cases the gas sample will be passed through the cell under a slight positive pressure, and where gas leakage is objectionable, as in the case of toxic or flammable gases or constituents thereof, a suitable packing gland can be included in the bearing assembly.

Ordinarily it is desirable to have container 1 of relatively great length in the direction of shaft 20, as seen in Figs. 1 and 3, which permits the use of a container of relatively small height and mounting the shaft at a low angle while maintaining the bearing above the electrolyte level.

In continuous operation of such a device the electrolyte will change in composition at a rate which will depend upon such factors as the concentration of the constituent to be determined, the volume of gas sample passed through the cell, the composition of the active electrode and the electrolyte, and the reactive area of the exposed electrode. The effect of the last-named factor is reduced to the greatest extent possible through the practice of the invention as described hereinabove. Such changes in composition as occur unavoidably will, of course, affect the E. M. F. generated, and for continuous recording or controlling purposes it is necessary that the sensitivity or accuracy of the system be maintained substantially constant, so that the composition of the electrolyte should be maintained as constant as possible. This may be accomplished by withdrawing electrolyte from outlet 7 and introducing fresh electrolyte through inlet 6. With low concentration of constituent to be determined this might be done intermittently, but where the concentration of constituent is high or large volumes of gas sample are passed through the device, the changes in electrolyte composition may render continuous electrolyte replacement desirable. For reasons of economy we prefer to recirculate the electrolyte, and the changes in composition which occur may be minimized by returning the withdrawn electrolyte to a storage receptacle containing a volume of electrolyte which is large relative to the amount of electrolyte within the cell, the electrolyte being withdrawn from storage for return to the cell. The mixing of the returned electrolyte with a larger body of electrolyte offsets the altered composition of the former to an extent that is proportional to the relative volume of the stored electrolyte and that which is in circulation. This results in relatively minor average changes in composition of the entire body of electrolyte so that it may be used over substantial periods of time. In this manner renewal of the electrolyte at intervals from only one week to two months becomes possible whereby attention and maintenance costs are decreased.

Such recirculation of the electrolyte may be effected in the manner shown in Fig. 6. Outlet 7 of the cell assembly C is connected by a conduit 48 to a storage reservoir 49 containing a volume of electrolyte 8a which is large compared with the volume of electrolyte circulating in the system. The electrolyte entering reservoir 49 through conduit 48 mixes therewith, and electrolyte is returned to the cell through a conduit 50 by means of a pump 51 actuated by any suitable means, not shown.

As indicated above, the level of the electrolyte in the cell C should be kept constant, and to this end container 1 is provided with constant level means, which may be of various types and variously located. We find, however, that the best results are to be had by disposing such means in the container, whereby changes in atmospheric or gas sample pressures have no effect on operation of the constant level means. In the embodiment shown this comprises a tubular member, or weir 700 which encloses outlet 7, its open upper end being at the desired electrolyte level.

Capillary action between the weir and the electrolyte might cause the latter to rise somewhat above the intended electrolyte level, and since this will be most observable in the region of the electrodes it may be objectionable. We have discovered, however, that this phenomenon may be suppressed by providing the upper end of weir 700 with means for eliminating capillarity. This may be done simply and cheaply, for example, by covering weir 700 with a screen or other foraminous member 701, which suitably will be of platinum because of its noble metal properties.

In some cases it will be desirable to provide the cell with a telltale so that circulation of the electrolyte may be observed. One form of such a device is shown in Fig. 2. A tubular member 702 leading from outlet 7 is connected, so as to close its lower end, to a cup member 703, and the tube is provided with openings 704 through which electrolyte flows into the cup. When cup 704 has become filled the electrolyte will overflow, and this dripping may be observed by mounting the device in a transparent container 705, Fig. 6, which gathers the flowing electrolyte and passes it to conduit 48. Observation of low rates of flow may be facilitated by the conical shaping of the bottom of cup 703 shown in Fig. 2.

The sensitivity of the apparatus may be maintained greater and over indefinite periods of time by regenerating the electrolyte before it is returned to the cell. This may be accomplished in various ways, depending upon the electrolyte in use, but this will be understood for any particular case from the specific example detailed hereinafter.

If the electrolyte is not regenerated in the manner just stated there will be a loss of sensitivity. In most cases this will be of the order of millivolts generated per 1 per cent of constituent to be determined. Thus, with a five gallon supply of electrolyte which is passed through the cell at a rate of about 150 cc. per minute and with a gas sample flow of 1 liter per minute, the loss of sensitivity in 24 hours will amount to from about 2 to 10 per cent of the oxygen reading, the exact variation being dependent on the total amount of oxygen sampled, the average temperature, and the temperature changes during that interval. To maintain accuracy, however, we prefer to provide means in the electrical system for keeping the recorder readings constant. Various circuits may be used for this purpose but we now prefer that shown in Fig. 7 because it permits correcting for changes in sensitivity due to alteration of electrolyte composition and related factors as well as for independent maintenance of the zero reading.

As shown in Fig. 7, the cell assembly C is connected to a suitable indicating or recording device 52 such, for example, as a potentiometer recorder. As there shown, the negative electrode of cell C is connected to a rheostat 53 that is in series with fixed resistances 54 and 55, a rheostat 56, and a rheostat 57 whose slider is connected by a lead 60 to the negative side of instrument 52. The positive electrode of cell C is connected to the positive side of measuring device 52 through a switch 59 and a lead 61 which is also connected to a resistance 58 in series with rheostat 57. The slider of rheostat 53 is connected in series with a pair of fixed resistances 62 and 63, the latter being in turn connected to the slider of rheostat 56. A battery or other suitable source of potential 64 is connected by leads 65 and 66 across the ends of fixed resistances 63 and 55.

The scale of instrument 52 will usually be calibrated to read directly the percentage of the constituent being determined.

The foregoing circuit may be used to correct for changes in sensitivity due to changes in electrolyte composition. Thus, from time to time, the cell may be flushed out with a gas of known concentration of the constituent to be determined. If the reading of the instrument corresponds to the composition of the known gas sample, no sensitivity correction is needed. If, however, the determination shows that the sensitivity of the system is changed, and generally the pointer deflection will fall off as sensitivity decreases, the rheostat 57 may be adjusted to alter the portion of the E. M. F. drop across rheostat 57 and resistance 58, which is recorded by instrument 52. By appropriately moving the slider of rheostat 57, therefore, the E. M. F. drop measured by the instrument can be changed so that meter 52 will give a reading corresponding to the concentration of constituent in the known sample.

The zero adjustment of the system may likewise require correction from time to time, for instance because of the presence of impurities in or on the electrodes. A feature of the foregoing circuit is that zero reading may be adjusted independently of and without disturbing the sensitivity of the system. Maintenance of correct zero reading is usually the more important of the two because the decrease in sensitivity is a slow and relatively regular process, amounting usually to only from 1 to 5 per cent per day, while shifts in zero adjustment may occur at any time, and be of serious magnitude, for example due to introduction of impurities by the sample or in the electrolyte. It is therefore important to be able to check the zero adjustment at frequent intervals. For this purpose the cell is flushed with a gas free from the constituent to be determined, and if the measuring instrument 52 does not show a zero reading, adjustment is effected by rheostats 53 and 56, the former being used for fine adjustment and the latter for coarse adjustment. This use of this or an equivalent circuit is particularly desirable where regeneration of the electrolyte, either continuous or intermittent, is not used. By a clock operated switch and a two-way solenoid valve one port of which is connected to a source of gas free from the constituent to be determined, the zero checking can be carried out and recorded automatically at regular intervals.

The invention may be explained further with reference to the determination of oxygen in admixture with other gases. For this purpose electrodes 15 and 43 are desirably of pure copper. The electrolyte suitably contains ammonium ions and is such as is described in the aforesaid patent. Briefly, if ammonium hydroxide is used the absolute sensitivity is not as great as when ammonim chloride is used, but the response is greatly accelerated and the shape of the calibration curve is such that relatively large deflections of the measuring instrument are produced in the low range of oxygen concentrations. Hence for determining low concentrations of oxygen the electrolyte is suitably ammonium hydroxide, and a sensitive meter is used, while for high concentrations of oxygen, as in ordinary air, there will be used a solution of ammonium chloride. For use over the entire range, the electrolyte may contain both the hydroxide and the chloride. Generally it is desirable also that the electrolyte contain a small amount of ammonium carbonate, to decrease carbon dioxide absorption and its effect on the absolute sensitivity, and also a small quantity of ammonio-cupric ions, which may be supplied easily by adding to fresh electrolyte a small amount of spent electrolyte.

To maintain sensitivity of the electrolyte and avoid disturbances due to the introduction of disturbing factors by the gas sample, it is desirable to associate the cell with various protective means which may take the form shown in Fig. 6. Gas to be tested is passed by any suitable means through a conduit 67 into the bottom of a countercurrent scrubber 68 through which a solution of caustic soda or other $CO_2$ absorbent is circulated by means of a conduit 69 leading to a reservoir 70 from which it is returned by a pump 71 through a conduit 72 into the top of the scrubber. The gas leaves the scrubber through a conduit 73 provided with a venting valve 74 that may be used for flushing the system at any time that may be desired, then passes through a three-way valve 75, a conduit 76, another three-way valve 77, a conduit 78, another three-way valve 79 and into a $CO_2$-indicator 80. From there it is led by a conduit 81 into a filter 82 for removing dust, grease and the like, then through a flow-regulating device 83, a flow-measuring device 84, a conduit 85 provided with a three-way valve 86 and into cell C, the gas leaving the cell through a conduit 87 associated with outlet 10. The electrolyte is recirculated as shown in the drawings and as described hereinabove.

The electrolyte may be regenerated in any suitable manner, as by continuous removal of the copper introduced into the electrolyte in its passage through the cell. This may be accomplished by electrodeposition from the electrolyte as it passes to the storage chamber 49 or as it is returned therefrom to the cell. Most suitably, however, an electrolytic cell 88 for plating copper from the electrolyte is inserted in return line 48, and in passing therethrough the copper picked up by the electrolyte in its passage from inlet 6 to outlet 7 is plated out. If needed, measured amounts of ammonia, suitably in the form of ammonium hydroxide solution, are added to the electrolyte to maintain the ammonia concentration at its original value. The amount of copper to be removed and of ammonia to be added will be in proportion to the oxygen concentration measured, of course.

Leading from valve 75 is a conduit 89 connected to one branch of a three-way valve 90 whose other branches are connected to a conduit 91 connected to a supply 92 of gas of known oxygen concentration, and a conduit 93 for supplying gas free from oxygen. These are used in a manner which will be clear from the drawings for checking the system.

A second $CO_2$ absorber 94 may be connected by a pipe 95 to valve 77 for removing carbon dioxide if indicator 80 shows the scrubber is passing that gas. Absorber 94 is connected by a pipe 96 to the indicator.

It is believed that the mode of operation of the apparatus shown will be clear from what has been said and from the explanation given in the aforesaid patent. Although the foregoing example relates to oxygen determination, other electrolytes and electrode materials may be used for determining other constituents of gases, such, for example, as those set forth in the said patent.

According to the provisions of the patent statutes, we have explained the principle, construction and method of operation of our invention and have illustrated and described what we now consider to represent its best embodiment. However, we desire to have it understood that, within the scope of the appended claims, the invention may be practiced otherwise than as specifically illustrated and described.

We claim:

1. A method of testing gas for a constituent thereof which comprises providing a voltaic cell containing a pair of electrodes one of which is inactive with respect to said constituent and the other of which presents a small surface of material reactive with said constituent, and an electrolyte acting as a solvent for the product of reaction between said constituent and said reactive electrode, alternately exposing a portion of said reactive electrode to said gas and then submerging it in the electrolyte, continuously measuring the electromotive force created by the cell when equilibrium has been attained between said reaction and the solution of reaction products by the electrolyte, and recirculating the electrolyte continuously from said cell to a body of the electrolyte which is large relative to the amount in the cell.

2. An electrode for gas testing apparatus comprising an electrode member formed of a disc or plate of metal reactive with a constituent to be determined and provided with a plurality of openings including a central axial aperture, a bushing associated with said aperture extending axially from one face of said plate, a coating of resilient non-conductive material that is inert to said constituent molded about said plate or disc to entirely cover its faces and leave its edge free, said coating being tapered inwardly adjacent the periphery of the plate or disc and being tapered outwardly to provide thickened portions adjacent said aperture, a shaft extending through said bushing and coating and provided with a non-conducting backing member inert to said constituent and shaped complementary to the adjacent surface of said coating, a backing ring in contact with and shaped complementary to the other face of said coating, and a nut detachably mounted upon said shaft and acting upon said second backing member and bushing to compress said coating between said backing members and seal the electrode against seepage of electrolyte between said coating and the electrode faces.

WILLIAM P. YANT.
MOSES G. JACOBSON.
JOHN P. STRANGE.